United States Patent
Nakashima et al.

(10) Patent No.: US 12,521,366 B2
(45) Date of Patent: Jan. 13, 2026

(54) ANTI-OBESITY COMPOSITION AND COMPOSITION FOR ORAL ADMINISTRATION

(71) Applicant: TOYO SHINYAKU CO., LTD., Fukuoka (JP)

(72) Inventors: Chie Nakashima, Saga (JP); Takumi Morikawa, Saga (JP); Tomoyasu Kamiya, Saga (JP)

(73) Assignee: TOYO SHINYAKU CO., LTD., Fukuoka (JP)

( * ) Notice: Subject to any disclaimer, the term of this patent is extended or adjusted under 35 U.S.C. 154(b) by 446 days.

(21) Appl. No.: 17/800,584

(22) PCT Filed: Jan. 29, 2021

(86) PCT No.: PCT/JP2021/003384
§ 371 (c)(1),
(2) Date: Aug. 18, 2022

(87) PCT Pub. No.: WO2021/255979
PCT Pub. Date: Dec. 23, 2021

(65) Prior Publication Data
US 2023/0123101 A1    Apr. 20, 2023

(30) Foreign Application Priority Data
Jun. 18, 2020    (JP) .................... 2020-105308

(51) Int. Cl.
*A61K 31/352* (2006.01)
*A23L 33/105* (2016.01)
*A61K 31/7048* (2006.01)

(52) U.S. Cl.
CPC .......... *A61K 31/352* (2013.01); *A23L 33/105* (2016.08); *A61K 31/7048* (2013.01)

(58) Field of Classification Search
None
See application file for complete search history.

(56) References Cited

U.S. PATENT DOCUMENTS

| | | | |
|---|---|---|---|
| 5,550,166 A * | 8/1996 | Ostlund | A61P 3/08 514/715 |
| 2009/0269772 A1 | 10/2009 | Califano et al. | |

FOREIGN PATENT DOCUMENTS

| | | |
|---|---|---|
| CN | 109078011 A | 12/2018 |
| CN | 109528741 A | 3/2019 |
| EP | 1336602 A1 | 8/2003 |
| JP | 2007137861 A | 6/2007 |
| JP | 2009-196931 A | 9/2009 |
| JP | 2015156854 A | 9/2015 |
| JP | 2017-171654 A | 9/2017 |
| KR | 20110029317 A | 3/2011 |

OTHER PUBLICATIONS

Fujiki et al., "Proven Functionality of Kudzu Flower Extract", Food Style 21, 2018, vol. 22, No. 8, pp. 88-91, total 12 pages; English trasnlation; Cited in ISR and JPOA.
Choi et al., "Metabolic response of soy pinitol on lipid-lowering, antioxidant and hepatoprotective action in hamsters fed-high fat and high cholesterol diet", Molecular Nutrition and Food Research, 2009, vol. 53, pp. 751-759; Cited in ISR.
International Search Report (ISR) dated Mar. 16, 2021 filed in PCT/JP2021/003384.
Masayuki Saito, "Regulatory Mechanisms of Energy Metabolism—Focusing on UCP", Science of Obesity [II] Mechanisms of Obesity, The 124th Japanese Association of Medical Sciences Symposium Records, Japanese Association of Medical Sciences, pp. 62 to 70, 2003 and its English translation.
Qun-Yi Li et al., "Tectorigenin regulates adipogenic differentiation and adipocytokines secretion via PPARγ and Ikk/NF-κb signaling", Pharmaceutical Biology, vol. 53(11), Apr. 9, 2015, pp. 1567-1575; Cited in Chinese Office Action dated May 23, 2024.

* cited by examiner

*Primary Examiner* — Dale R Miller
(74) *Attorney, Agent, or Firm* — RANKIN, HILL & CLARK LLP

(57) ABSTRACT

It is an object of the present invention to provide an anti-obesity composition and an oral administration composition that can promote the gene expression of proteins such as PGC1α and UCP1 that are involved in brown adipocytes and the energy consumption activity of the brown adipocytes, and have the effect of promoting the energy consumption activity in the brown adipocytes. The compositions of the present invention contain a tectorigenin-like substance and pinitol. The tectorigenin-like substance is preferably tectorigenin. The compositions of the present invention can suitably be used as an anti-obesity composition or an oral administration composition.

9 Claims, 1 Drawing Sheet

ANTI-OBESITY COMPOSITION AND COMPOSITION FOR ORAL ADMINISTRATION

TECHNICAL FIELD

The present invention relates to a composition that can be used for anti-obesity, body fat reduction, fat metabolism promotion, fat combustion promotion, thermogenesis promotion, energy consumption promotion, or oral administration. The present invention also relates to use of a tectorigenin-like substance and pinitol in the manufacture of functional food for ameliorating obesity, body fat reduction, fat metabolism promotion, fat combustion promotion, thermogenesis promotion, or energy consumption promotion. The present invention also relates to a method for ameliorating obesity, body fat reduction, fat metabolism promotion, fat combustion promotion, thermogenesis promotion, or energy consumption promotion, in which a composition that contains a tectorigenin-like substance and pinitol is used.

BACKGROUND ART

Obesity is deeply related to the consumption of body fat. Specifically, the consumption of fat has the following mechanism.

When an adipokinetic hormone such as noradrenaline is secreted, hormone sensitive lipase, which is a lipolytic enzyme, is activated in white adipocytes that are distributed beneath the skin and in the internal organs to decompose triglyceride (neutral fat) stored in the white adipocytes into glycerol and free fatty acids, which are then released into the blood. The free fatty acids released into the blood are taken into mitochondria of brown adipocytes that are distributed in the liver, the muscles, supraclavicular area, chest area, the shoulders, and the like, and then consumed as heat. As described above, the white adipocytes function to accumulate excessive energy in the body as fat, whereas the brown adipocytes function to burn fat to produce heat.

UCP1 and PGC1α are known as examples of candidate molecules that are involved in autonomous adjustment of energy consumption.

UCP has the function of uncoupling oxidative phosphorylation reactions in the mitochondrial inner membrane to dissipate energy as heat. For the most representative UCP1 in the brown adipocytes, the following facts are known: (1) the function of UCP1 is low in obese animals; (2) animals that are not obese despite of eating a lot have a large amount of UCP1; and (3) mice whose UCP1 gene expression level is artificially lowered become obese whereas mice whose UCP1 gene expression level is high become lean. Likewise, for PGC1α, it is known that PGC1α mediates the activation of UCP1 via stimulation of β adrenaline receptors in the brown adipocytes, and that PGC1α has the effect of promoting the growth of mitochondria (Non Patent Literature 1).

Accordingly, anti-obesity effects can be expected by activating UCP1 and PGC1α, and thus there is need for medicines and food that exhibit excellent performance in activating UCP1 and PGC1α.

Meanwhile, conventionally, various types of anti-obesity agents including those disclosed in Patent Literature 1 are known as the agents for reducing white adipose tissue such as subcutaneous adipose tissue.

CITATION LIST

Patent Literatures

Patent Literature 1: JP 2017-171654A
Patent Literature 2: JP 2009-196931A

Non Patent Literature

Non Patent Literature 1: The 124th Japanese Association of Medical Sciences Symposium Records "Science of Obesity", Japanese Association of Medical Sciences, pp. 62 to 70, 2003

SUMMARY OF INVENTION

The activity of consuming energy such as fatty acids in the brown adipocytes to produce heat (hereinafter also referred to as "energy consumption activity") is important for lipid metabolism, and if this activity can be activated, it can be expected that more body fat is converted into heat to more effectively obtain anti-obesity effects.

However, none of the conventional techniques described above gives consideration to promoting the energy consumption activity in the brown adipocytes.

Also, the inventors of the present application conducted studies and found that it cannot be said that any of the conventional anti-obesity agents for reducing white adipose tissue, when used alone, is sufficient to promote the energy consumption activity that takes place in the brown adipocytes.

The inventors of the present application conducted in-depth studies on the configuration of a composition that can promote the energy consumption activity in the brown adipocytes by checking the gene expression of proteins such as PGC1α and UCP1 that are involved in the energy consumption activity in the brown adipocytes. As a result, they found a surprising result in that the gene expression of these proteins can be promoted by using a combination of specific ingredients, and excellent effect of promoting the energy consumption can be obtained.

The present invention has been accomplished based on the findings described above, and provides an anti-obesity composition that contains a tectorigenin-like substance and pinitol.

The present invention provides a composition for reducing body fat or promoting fat metabolism that contains a tectorigenin-like substance and pinitol.

The present invention provides a composition for promoting fat combustion, promoting thermogenesis, or promoting energy consumption that contains a tectorigenin-like substance and pinitol.

Also, the present invention provides an oral administration composition that contains a tectorigenin-like substance and pinitol to a subject.

Also, the present invention provides use of a tectorigenin-like substance and pinitol in the manufacture of functional food for ameliorating obesity, reducing body fat, promoting fat metabolism, promoting fat combustion, promoting thermogenesis, or promoting energy consumption.

Also, the present invention provides a method for ameliorating obesity, reducing body fat, promoting fat metabolism, promoting fat combustion, promoting thermogenesis, or promoting energy consumption, comprising a step of administering a composition that contains a tectorigenin-like substance and pinitol.

Advantageous Effects of Invention

According to the present invention, it is possible to provide a useful oral administration composition that contains a composition that contains a tectorigenin-like substance and pinitol, and more particularly, it is possible to provide an anti-obesity composition, a composition for body fat reduction, a composition for fat metabolism promotion, a composition for fat combustion promotion, a composition for thermogenesis promotion, and a composition for energy consumption promotion that are effective, can promote the gene expression of proteins such as PGC1α and UCP1 that are involved in the energy consumption activity in the brown adipocytes, and have the effect of promoting the energy consumption activity in the brown adipocytes. Furthermore, it is possible to provide an oral administration composition that has the effect of promoting the energy consumption activity in the brown adipocytes via the above-described effect of promoting the gene expression of PGC1α and UCP1, and is effective in anti-obesity, body fat reduction, fat metabolism promotion, fat combustion promotion, thermogenesis promotion, and energy consumption promotion. Also, according to the present invention, it is possible to provide use of a composition for ameliorating obesity that contains a tectorigenin-like substance and pinitol, with which the gene expression of PGC1α and UCP1 can be promoted, and also the energy consumption activity in the brown adipocytes can be promoted, and it is also possible to provide a method for ameliorating obesity, in which a tectorigenin-like substance and pinitol are used as active ingredients.

DESCRIPTION OF EMBODIMENT

Figure 1:
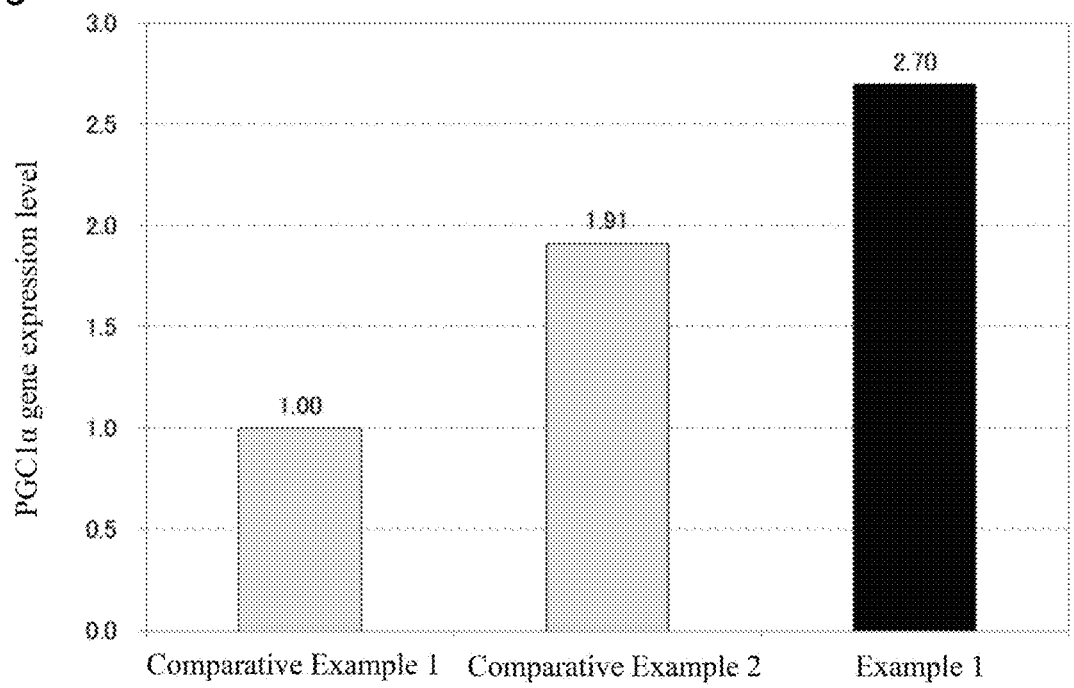
FIG. 1 is a graph showing PGC1α gene expression level according to Example and Comparative Examples.

Hereinafter, the present invention will be described in further detail based on an embodiment thereof. However, the present invention is not limited to the description given below. Hereinafter, an anti-obesity composition, a composition for reducing body fat, a composition for promoting fat metabolism, a composition for promoting fat combustion, a composition for promoting thermogenesis, a composition for promoting energy consumption, and an oral administration composition according to the present invention are collectively referred to as "the composition of the present invention".

Tectorigenin-Like Substance

The term "tectorigenin-like substance" refers to tectorigenin, a tectorigenin glycoside, and derivatives thereof.

Tectorigenin is a flavonoid that is present in plants such as Iridaceae, and is represented by the molecular formula $C_{16}H_{12}O_6$. Tectorigenin may also be called 5,7-dihydroxy-3-(4-hydroxyphenyl)-6-methoxy-4H-1-benzopyran-4-one, or 6-methoxy-5,7-dihydroxy-3-(4-hydroxyphenyl)-4H-1-benzopyran-4-one. In the description of the present application, the term "tectorigenin", when used alone, refers to the above-described aglycone form tectorigenin. Tectorigenin has the following chemical formula.

[Chem. 1]

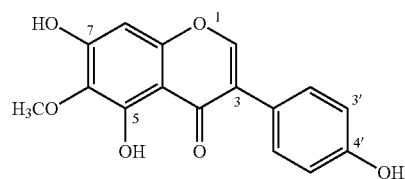

The term "tectorigenin glycoside" used in the present invention refers to a compound obtained by bonding one or more saccharides selected from monosaccharides and/or a sugar acid to tectorigenin that was described above. The monosaccharides preferably include pentose and hexose, more preferably include one or more selected from glucose, xylose, mannose, fructose, sorbose, galactose, apiose, and rhamnose, and even more preferably include one or more selected from glucose and xylose. Also, as the sugar acid, it is preferable to use uronic acid, and it is more preferable to use glucuronic acid or galacturonic acid. In the glycoside, normally, the saccharides and/or the sugar acid are bonded to a hydroxyl group at 4'-position and/or a hydroxyl group at 7-position of tectorigenin. In the present invention, it is preferable that the saccharides and/or the sugar acid are bonded to a hydroxyl group at 7-position. The number of the saccharides and/or the sugar acid (also referred to as the number of bonds of the saccharides and/or the sugar acid) in the tectorigenin glycoside is, for example, 1 or more and 5 or less, preferably 1 or more and 4 or less, and more preferably 1 or more and 3 or less. The number of the saccharides and/or the sugar acid refers to the total number of the saccharides and/or the sugar acid. Here, the expression "n saccharides are bonded to tectorigenin" may mean that n saccharide linkages are bonded, or that the total number of saccharides bonded to different positions of tectorigenin is n. The same applies to the case where the glycoside contains sugar acids.

An example of a derivative of tectorigenin or a tectorigenin glycoside includes a compound obtained as a result of one or more hydrogen atoms in tectorigenin or the tectorigenin glycoside being substituted by substituents. Examples of the substituents include an amino group, a sulfonic acid group, an alkyl group with 1 or more and 6 or less carbon atoms, an alkoxy group with 1 or more and 4 or less carbon atoms, and the like. The number of substituents in the tectorigenin-like substance is preferably 8 or less, more preferably 4 or less, and most preferably 0.

In the composition of the present invention, as the tectorigenin-like substance, only one compound or a mixture of two or more compounds selected from the tectorigenin, the tectorigenin glycosides, and the derivatives of the tectorigenin or the tectorigenin glycosides that were described above may be used. In particular, in the composition of the present invention, the tectorigenin-like substance is preferably tectorigenin and/or a tectorigenin glycoside from the viewpoint of anti-obesity activity. In particular, the composition of the present invention preferably contains tectorigenin as the tectorigenin-like substance from the viewpoint of excellent effect of promoting the energy consumption activity in the brown adipocytes and availability. In the composition of the present invention, the tectorigenin-like substance may be an organic synthetic product or an extract obtained from a plant or the like.

Pinitol

Pinitol is also called 3-O-methyl-D-chiro-inositol, and is an inositol. Pinitol is contained in plants such as *Ceratonia siliqua* and clover. In the composition of the present invention, pinitol may be an organic synthetic product or an extract obtained from a plant or the like.

In the present invention, the content ratio of the tectorigenin-like substance to pinitol is preferably within a specific range because, when the content ratio is within a specific range, excellent gene expression of PGC1α and UCP1 can be obtained, and the energy consumption activity in the brown adipocytes can be further enhanced. In order to enhance the energy consumption activity in the brown adipocytes, the content ratio of the tectorigenin-like substance to pinitol, which is expressed by tectorigenin-like substance:pinitol, is preferably 1:0.01 or more and 1:50 or less, more preferably 1:0.05 or more and 1:30 or less, and even more preferably 1:0.1 or more and 1:26 or less in terms of mass ratio. Also, for the same reason, when tectorigenin is contained as the tectorigenin-like substance, the content ratio of tectorigenin and pinitol, which is expressed by tectorigenin:pinitol, is preferably 1:0.01 or more and 1:50 or less in terms of mass ratio. In particular, for excellent energy consumption activity in the brown adipocytes by promotion of the gene expression of UCP1, the content ratio of tectorigenin and pinitol is more preferably greater than 1:0.5 and 1:30 or less, even more preferably 1:0.7 or more and 1:30 or less, and most preferably 1:1 or more and 1:26 or less.

The amount of the tectorigenin-like substance in the composition of the present invention can be measured using a high performance liquid chromatography method (HPLC method).

For example, the measurement can be performed using YMC-Pack ODS AM12S05-2546 WT (φ4.6×250 mm) available from YMC Co., Ltd., and a mixed solution of acetonitrile, water, and acetic acid (mobile phase A, volume ratio=15:85:0.1, and mobile phase B, volume ratio=35:65:0.1) as a liquid medium for the mobile phases by setting the column temperature to 35° C. and the flow rate to 1.0 ml/min.

The gradient condition can be set as shown in Table A given below.

TABLE A

| Time (minute) | Solution A (%) | Solution B (%) |
|---|---|---|
| 0 | 100 | 0 |
| 50 | 0 | 100 |
| 55 | 0 | 100 |
| 57 | 100 | 0 |
| 70 | 100 | 0 |

The amount of pinitol in the composition of the present invention can be measured using an HPLC method.

For example, the measurement can be performed using Inert Sustain NH2 (3 μm, φ3×250 mm) available from GL Sciences, Inc. as the column, and a mixed solution of 1 mM hydrochloric acid and chromatography acetonitrile (volume ratio=30/70) as a liquid medium for the mobile phases by setting the column temperature to 40° C. and the flow rate to 0.5 ml/min.

The composition of the present invention may contain, in addition to the tectorigenin-like substance and pinitol, other components that are usually used, as long as the advantageous effects of the present invention are not impaired. Examples of other components include various types of excipients, binders, brighteners, lubricants, stabilizers, diluents, extenders, thickeners, emulsifiers, antioxidants, pH modifiers, colorants, flavoring agents, additives, and the like. The amount of other components can be selected as appropriate according to the form of the composition of the present invention and the like.

The composition of the present invention is applicable to both oral and non-oral applications. In the case where the composition of the present invention is used as a non-oral administration composition, for example, the composition may be administered by administering the composition directly to the stomach using a catheter or the like. However, the composition of the present invention is preferably used as an oral administration composition because the effect of promoting the energy consumption according to the present invention can be easily obtained.

In the case where the composition of the present invention is used as an oral administration composition, the composition can be provided in, for example, a tablet form, a capsule form, a powder form, a granule form, a liquid form, a particle form, a rod-like form, a plate-like form, a block form, a solid form, a round form, a paste form, a cream form, a caplet form, a gel form, a chewable form, a stick form, or the like. Among these, it is particularly preferable that the composition is in a tablet form, a capsule form, a powder form, a granule form, or a liquid form. Examples of the oral administration composition used in a tablet form, a capsule form, a powder form, a granule form, or a liquid form include: a dietary supplement; a food additive; a beverage in a container such as a PET bottle, a can, or a bottle; a powder beverage that is dissolved in water (hot water), milk, juice, or the like before drinking; and the like. These are preferable because they can be readily taken during a meal or the like, and palatability can be enhanced.

Also, as a specific example of the oral administration composition of the present invention, the oral administration composition may be contained in food as a composition for food or beverages. Examples of food include various types of food such as tea bags, bread, sweets, and noodles, cooked food, and the like. Examples of bread and sweets include: various types of bread such as loaves, pastries, French bread, English bread, muffins, steamed buns, doughnuts, and waffles; various types of cakes such as butter cakes, sponge cakes, chiffon cakes, pancakes; chocolate; various types of frozen sweets such as sherbet and ice creams; jelly; cookies; and the like. Examples of noodles include udon noodles, somen noodles, and the like. Examples of cooked food include: various types of soup such as curry, stew, miso soup, and vegetable soup; stock/broth cubes; seasonings; and the like.

In the composition of the present invention, the total amount of pinitol and the tectorigenin-like substance in the solid content of the composition is preferably 0.001 mass % or more and 40 mass % or less from the viewpoint of promoting the energy consumption activity in the brown adipocytes and ease of continuation of oral administration in daily life, more preferably 0.005 mass % or more and 35 mass % or less, and even more preferably 0.01 mass % or more and 30 mass % or less. The term "solid content" refers to an amount obtained by subtracting the amount of water from the amount of the composition.

In the case where the composition of the present invention is orally taken, from the viewpoint of promoting the energy consumption activity in the brown adipocytes and ease of continuation of oral administration in daily life, as the oral dose per day for an adult, the total amount of pinitol and the tectorigenin-like substance is preferably about 0.1 mg or more and 500 mg or less, and more preferably 0.5 mg or more and 300 mg or less. Also, as the single dose of the composition of the present invention per day for an adult person, the total amount of pinitol and the tectorigenin-like substance is preferably about 1 mg or more and 300 mg or less.

Specific examples of applications of the composition of the present invention include medical and pharmaceutical products (including quasi drugs), ordinary food, nutritionally functional food, food for specified health use with an indication of efficacy approved by a predetermined authority, and so-called health functional food such as food claiming as nutritionally functional food. The food with an indication of efficacy may be collectively referred to as "functional food".

As will be demonstrated in examples given below, with the composition of the present invention, the energy consumption in the brown adipocytes and the brown adipose tissue that contains the brown adipocytes can be promoted by promoting the gene expression of a plurality of proteins that are involved in the energy consumption in the brown adipocytes. Examples of the gene include PGC1α gene and UCP1 gene.

PGC1α (PPARγ coactivator 1α) is a protein that is coded by PGC1α gene, and has been identified as a transcriptional coactivator that activates transcription mediated by nuclear receptor PPARγ. PGC1α activates transcription factor NRF (nuclear respiratory factor) 1/NRF2, and NRF promotes transcription of TFAM (mitochondria transcription factor), thereby activating mitochondrial biogenesis. It is known that the number of mitochondria increases by promoting PGC1α gene expression. PGC1α is a factor that bundles the nuclear receptors in the brown adipocytes, and is involved in promoting UCP1 gene expression. Accordingly, by promoting PGC1α gene expression, the energy consumption promotion activity and the like can be expected via the activity of increasing the number of mitochondria in the brown adipocytes and the activity of promoting UCP1 gene expression. PGC1α gene may also be expressed as "Pgc1α".

UCP1 gene is a gene that codes uncoupling protein 1 (UCP1), and may also be expressed as "Ucp1". In the brown adipocytes, UCP1 gene is specifically expressed in the mitochondria of the brown adipocytes. UCP1 gene has an activity of uncoupling oxidative phosphorylation in the mitochondria. When this activity is activated, the energy generated by oxidative decomposition of fatty acids and glucose is, instead of being used for ATP synthesis, converted directly into heat, and then dissipated and consumed. By promoting UCP1 gene expression, the consumption of fatty acids in the brown adipocytes can be promoted, which may suppress or eliminate obesity.

The present invention may have the effect of promoting either one of or both of PGC1α gene expression and UCP1 gene expression. The composition of the present invention is applicable to, in addition to promoting PGC1α gene expression and UCP1 gene expression, various types of applications such as fat combustion promotion, thermogenesis promotion, fat metabolism promotion, body fat reduction, and energy consumption promotion in the subject. The fat combustion promotion refers to promoting the activity of converting fatty acids into heat by the brown adipocytes. The thermogenesis promotion refers to promoting, for example, thermogenesis from neutral fat by the brown adipocytes. The fat metabolism promotion refers to, for example, the activity of qualitatively converting adipocytes and adipose tissue that constitute obesity to small normal adipocytes, or the activity of metabolism of fatty acids by the brown adipocytes. The body fat reduction refers to the activity of reducing body fat by, for example, converting fatty acids into heat. Also, the anti-obesity refers to, for example, the activity of reducing body fat or suppressing an increase in the body fat by promoting the metabolism of fatty acids in the brown adipocytes and the brown adipose tissue. The energy consumption promotion refers to promoting, for example, the activity of consuming chemical energy such as fatty acids by the brown adipocytes. These activities are performed via activation of PGC1α and UCP1 in the brown adipocytes.

In the present invention, the brown adipocytes are located in the liver, the muscles, supraclavicular area, the chest (chest area), the shoulders (the shoulder blades and shoulder blade areas), and the like.

The composition of the present invention can be used for lipolysis promotion, anti-obesity, and a diet for weight reduction, and thus in this regard, the composition of the present invention, when used as a product, is distinguishable from other products. For example, when the composition of the present invention has an indication of having the function of lipolysis promotion, the indication is targeted for people who are concerned about body fat such as people who are concerned about obesity, people who are concerned about waist, people who are concerned about weight, people who are concerned about abdominal fat (internal organ fat, subcutaneous fat, and the like), or indicates that the composition helps in reducing body fat such as helping in reducing weight, helping in reducing abdominal fat (internal organ fat, subcutaneous fat, and the like), helping in reducing the waist circumference, supporting obesity elimination, supporting a diet for weight reduction, facilitating consumption of fat, facilitating fat combustion, helping in consumption of fat, helping in fat combustion, promoting decomposition of fat, facilitating decomposition of fat, and helping in decomposition of fat.

EXAMPLES

Hereinafter, the present invention will be described in further detail based on examples. However, the scope of the present invention is not limited to the examples given below. In the description given below, unless otherwise stated, the percent sign "%" means "mass %", and the term "part(s)" means "part(s) by mass".

Measurement of PGC1α Gene Expression Level

Example 1 and Comparative Examples 1 to 2

(1) A test substance containing tectorigenin (available from Tokyo Chemical Industry Co., Ltd.) as the tectorigenin-like substance and D-pinitol (available from Tokyo Chemical Industry Co., Ltd.) as the pinitol was used.

(2) A medium for growth was used as a growth medium, a medium for differentiation induction was used as a differentiation induction medium, and an adipocyte maintenance medium was used as a differentiation maintenance medium. As the three media listed above, those contained in a brown adipocyte culture kit F-8 (rat) (available from Cosmo Bio Co., Ltd., derived from interscapular brown adipose tissue) were used. Brown adipocytes derived from interscapular brown adipose tissue are frequently used to check the function of brown adipocytes involved in fat combustion.

(3) A differentiation induction medium containing a test substance was prepared in the manner described below. Specifically, the test substance was dissolved in DMSO, and then diluted in the differentiation induction medium to adjust the final DMSO concentration to be 0.5 vol %, followed by filter sterilization. After the sterilization, dilution was performed using the differentiation induction medium containing 0.5 vol % DMSO until the tectorigenin concentration and the pinitol concentration were as shown in Table 1 given below.

(4) A differentiation maintenance medium containing a test substance was prepared in the manner descried below. Specifically, the test substance was dissolved in DMSO and then diluted in the differentiation maintenance medium to adjust the final DMSO concentration to be 0.5 vol %, followed by filter sterilization. After the sterilization, dilution was performed using the differentiation maintenance medium containing 0.5 vol % DMSO until the tectorigenin concentration and the pinitol concentration were as shown in Table 1 given below.

(5) Rat brown preadipocytes (available from Cosmo Bio Co., Ltd.) were seeded at 500 µl/well in a 24-well plate coated with collagen using a growth medium to $3.0 \times 10^4$ cells/well, and cultured at 37° C. in a 5 (vol/vol) % $CO_2$ incubator until the cell density was about 90%.

(6) After the medium was removed, the differentiation induction medium containing the test substance was added at 500 µL/well, and cultured at 37° C. in a 5 (vol/vol) % $CO_2$ incubator for 48 hours to induce the differentiation into brown adipocytes.

(7) After the medium was removed, the differentiation maintenance medium containing the test substance was added at 500 µL/well, and cultured at 37° C. in a 5 (vol/vol) % $CO_2$ incubator for 72 hours.

(8) After the medium was removed, the differentiation maintenance medium containing the test substance was added at 500 µL/well, and cultured at 37° C. in a 5 (vol/vol) % $CO_2$ incubator for another 72 hours.

(9) After the medium was removed, washing was performed twice using PBS, and RNA was recovered using RNeasy Mini Kit (available from QIAGEN) to synthesize cDNA using ReverTra Ace® qPCR RT Master Mix (available from TOYOBO).

(10) Using the obtained cDNA as a template, quantitative real-time PCR was performed using the primers of PGC1α genes (available from QIAGEN) and QuantiNova SYBR Green PCR Kit (available from QIAGEN) to measure mRNA gene expression level of PGC1α. FIG. 1 shows relative values of mRNA gene expression level of PGC1α obtained in Example 1 and Comparative Examples 1 to 2 with respect to a value obtained in Comparative Example 1 being set to 1.

TABLE 1

|  | Tectorigenin (µM) | Pinitol (µM) | Tectorigenin:pinitol (mass ratio) |
|---|---|---|---|
| Comparative Example 1 | 100 | — | 1:0 |
| Comparative Example 2 | — | 1000 | 0:1 |
| Example 1 | 50 | 500 | 1:6.5 |

Measurement of UCP1 Gene Expression Level

Examples 2 to 4 and Comparative Examples 3 to 4

Figure 2:
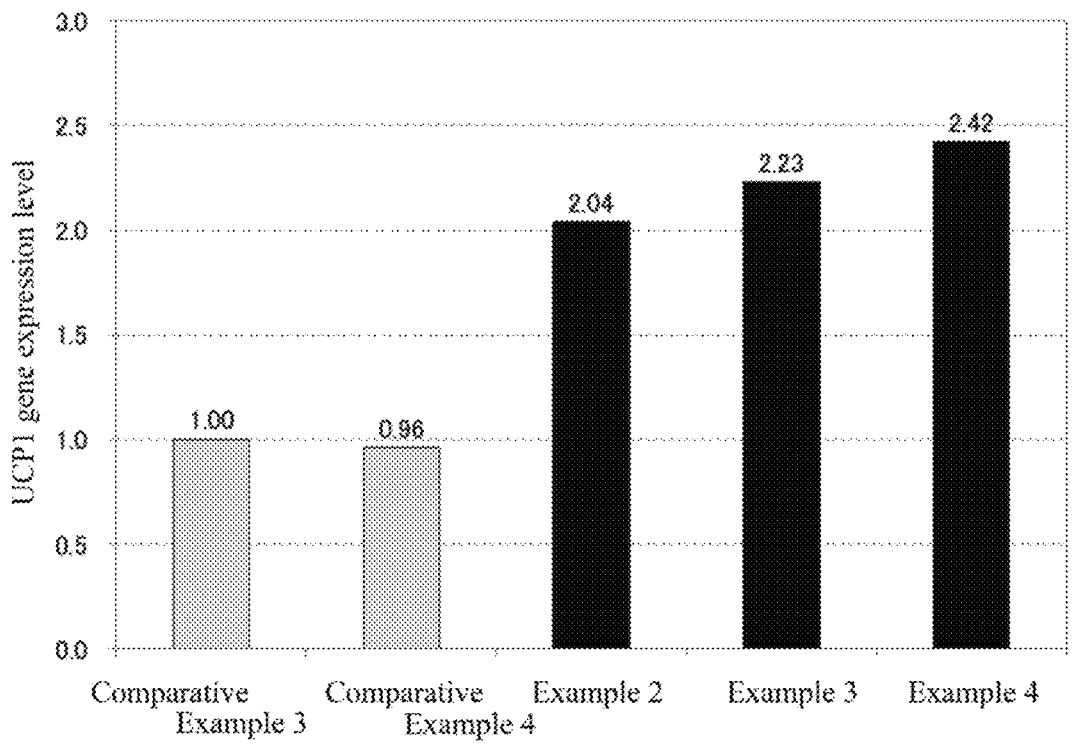
FIG. 2 is a graph showing UCP1 gene expression level according to Examples and Comparative Examples.

The primers of UCP1 genes (available from QIAGEN) were used instead of Pgc1α. Also, a test substance with a composition shown in Table 2 given below was used. The concentration of the test substance in the differentiation induction medium and the differentiation maintenance medium was set to 50 µM. Other than the above, mRNA gene expression level of UCP1 was measured in the same manner as in Example 1 and Comparative Examples 1 to 2. FIG. 2 shows relative values of mRNA gene expression level of UCP1 obtained in Examples 2 to 4 and Comparative Examples 3 to 4, with respect to a value obtained in Comparative Example 3 being set to 1.

TABLE 2

|  | Tectorigenin:pinitol (mass ratio) |
|---|---|
| Comparative Example 3 | 1:0 |
| Comparative Example 4 | 0:1 |
| Example 2 | 1:1.3 |
| Example 3 | 1:16.2 |
| Example 4 | 1:25.9 |

As shown in FIGS. 1 and 2, in the case where the brown adipocytes were differentiated and maintained under the presence of the composition of the present invention composed of a combination of the tectorigenin-like substance and pinitol, both of PGC1α gene expression level and UCP1 gene expression level significantly exceeded as compared with those obtained in the case where the tectorigenin-like substance and pinitol were each independently used. In particular, with respect to UCP1 gene that plays an important role in energy consumption, synergistic effect of promoting the gene expression was obtained by using the tectorigenin-like substance and pinitol in combination.

Accordingly, it is clear that the composition of the present invention exhibits an excellent activity of promoting the energy consumption in the brown adipocytes, and serves as an excellent anti-obesity agent.

Granules composed of the following components (3000 mg per dose pack) were produced. Excellent anti-obesity effects can be obtained by taking one dose pack of the obtained granules by suspending the granules in water twice a day.

TABLE 3

| Raw material | Blending amount (mass %) |
|---|---|
| Tectorigenin | 1.0 |
| Pinitol | 5.0 |
| Barley grass powder | 30.0 |
| Reduced maltose | 30.0 |
| Lactic acid | 1.0 |
| Vitamin B2 | 0.1 |
| Vitamin B6 | 0.5 |
| Indigestible dextrin | 32.4 |
| Total | 100 |

Granules composed of the following components (2000 mg per dose pack) were produced. Excellent anti-obesity effects can be obtained by taking one dose pack of the obtained granules by suspending the granules in hot water three times a day.

TABLE 4

| Raw material | Blending amount (mass %) |
|---|---|
| Tectorigenin | 0.2 |
| Tectoridin | 2.0 |

TABLE 4-continued

| Raw material | Blending amount (mass %) |
| --- | --- |
| Pinitol | 2.0 |
| Green tea extract powder | 10.0 |
| Matcha (green tea ground into a fine powder) | 10.0 |
| Vitamin C | 1.0 |
| Dextrin | 74.8 |
| Total | 100 |

Tablets composed of the following components (200 mg per tablet) were produced. Excellent anti-obesity effects can be obtained by taking four tablets twice a day.

TABLE 5

| Raw material | Blending amount (mass %) |
| --- | --- |
| Tectorigenin | 1.0 |
| Tectorigenin 7-O-xylosylglucoside | 5.0 |
| Pinitol | 10.0 |
| Reduced palatinose | 78.0 |
| Sucrose fatty acid ester | 5.0 |
| Silicon dioxide | 1.0 |
| Total | 100 |

Tablets composed of the following components (300 mg per tablet) were produced. Excellent anti-obesity effects can be obtained by taking five tablets once a day.

TABLE 6

| Raw material | Blending amount (mass %) |
| --- | --- |
| Tectorigenin | 1.5 |
| Tectoridin | 3.0 |
| Tectorigenin 7-O-xylosylglucoside | 5.0 |
| Pinitol | 15.0 |
| Hyaluronic acid | 0.5 |
| Collagen peptide | 1.0 |
| Reduced palatinose | 71.0 |
| Calcium stearate | 2.0 |
| Silicon dioxide | 1.0 |
| Total | 100 |

Capsules composed of the following components (300 mg per capsule) were produced. Excellent anti-obesity effects can be obtained by taking two capsules twice a day.

TABLE 7

| Raw material | Blending amount (mass %) |
| --- | --- |
| Tectorigenin | 0.5 |
| Tectoridin | 10.0 |
| Tectorigenin 7-O-xylosylglucoside | 20.0 |
| Pinitol | 10.0 |
| Cellulose | 58.5 |
| Silicon dioxide | 1.0 |
| Total | 100 |

INDUSTRIAL APPLICABILITY

The composition of the present invention has a high level of industrial applicability because high anti-obesity effects can be expected.

The invention claimed is:

1. An oral administration composition comprising:
   tectorigenin; and
   pinitol,
   wherein a content ratio of the tectorigenin to the pinitol is 1:16.2 or more and 1:25.9 or less in terms of mass ratio.

2. The oral administration composition according to claim 1, being functional food for ameliorating obesity.

3. A method for reducing body fat, promoting fat metabolism, or promoting fat combustion, comprising a step of administering the oral administration composition according to claim 1 to a subject.

4. An anti-obesity composition comprising the oral administration composition according to claim 1.

5. The anti-obesity composition according to claim 4, being a composition for reducing body fat or promoting fat metabolism.

6. The anti-obesity composition according to claim 5, wherein reducing body fat and promoting fat metabolism are accomplished by way of promoting consumption of fatty acids in brown adipocytes.

7. The anti-obesity composition according to claim 4, being a composition for promoting fat combustion, promoting thermogenesis, or promoting energy consumption.

8. The anti-obesity composition according to claim 7, wherein promoting fat combustion, promoting thermogenesis, and promoting energy consumption are accomplished by way of promoting consumption of fatty acids in brown adipocytes.

9. The method according to claim 3, wherein an oral dose per day for an adult is 0.1 mg or more and 500 mg or less of the total amount of the pinitol and the tectorigenin.

\* \* \* \* \*